United States Patent [19]

Iwata

[11] Patent Number: 4,848,304
[45] Date of Patent: Jul. 18, 1989

[54] IGNITION CONTROL DEVICE FOR INTERNAL COMBUSTION ENGINE

[75] Inventor: Toshio Iwata, Hyogo, Japan
[73] Assignee: Mitsubishi Denki Kabushiki Kaisha, Tokyo, Japan
[21] Appl. No.: 306,227
[22] Filed: Feb. 3, 1989

Related U.S. Application Data

[63] Continuation of Ser. No. 7,225, Jan. 27, 1987, abandoned.

[30] Foreign Application Priority Data

Jan. 30, 1986 [JP] Japan .................................. 61-20623

[51] Int. Cl.$^4$ ............................................. F02D 3/04
[52] U.S. Cl. ................................................. 123/609
[58] Field of Search .......................... 123/609, 610, 644

[56] References Cited

U.S. PATENT DOCUMENTS

| | | | |
|---|---|---|---|
| 4,275,701 | 6/1981 | Arguello et al. | 123/609 |
| 4,285,323 | 8/1981 | Sugiura et al. | 123/609 |
| 4,391,262 | 7/1983 | Schlcupan | 123/609 |
| 4,440,141 | 4/1984 | Tsujimura et al. | 123/609 |
| 4,538,585 | 9/1985 | Arguello et al. | 123/609 |
| 4,552,118 | 11/1985 | Fukaya | 123/609 |
| 4,627,398 | 12/1986 | Koika | 123/609 |
| 4,649,888 | 3/1987 | Kawai et al. | 123/609 |
| 4,739,743 | 4/1988 | Iwata | 123/609 |
| 4,762,110 | 8/1988 | Iwata | 123/609 |
| 4,773,380 | 9/1988 | Narita et al. | 123/609 |
| 4,787,354 | 11/1988 | Wilens et al. | 123/609 |

Primary Examiner—Raymond A. Nelli
Attorney, Agent, or Firm—Sughrue, Mion, Zinn, Macpeak and Seas

[57] ABSTRACT

When an internal combustion engine is accelerated at high rate, a feedback control constant for an ignition current supply period is changed to control a ratio of a time period for which a primary current of the ignition coil is at a predetermined value to an ignition period to a predetermined value to thereby maintain a sufficient cut off current even at such high rate acceleration of the engine.

3 Claims, 2 Drawing Sheets

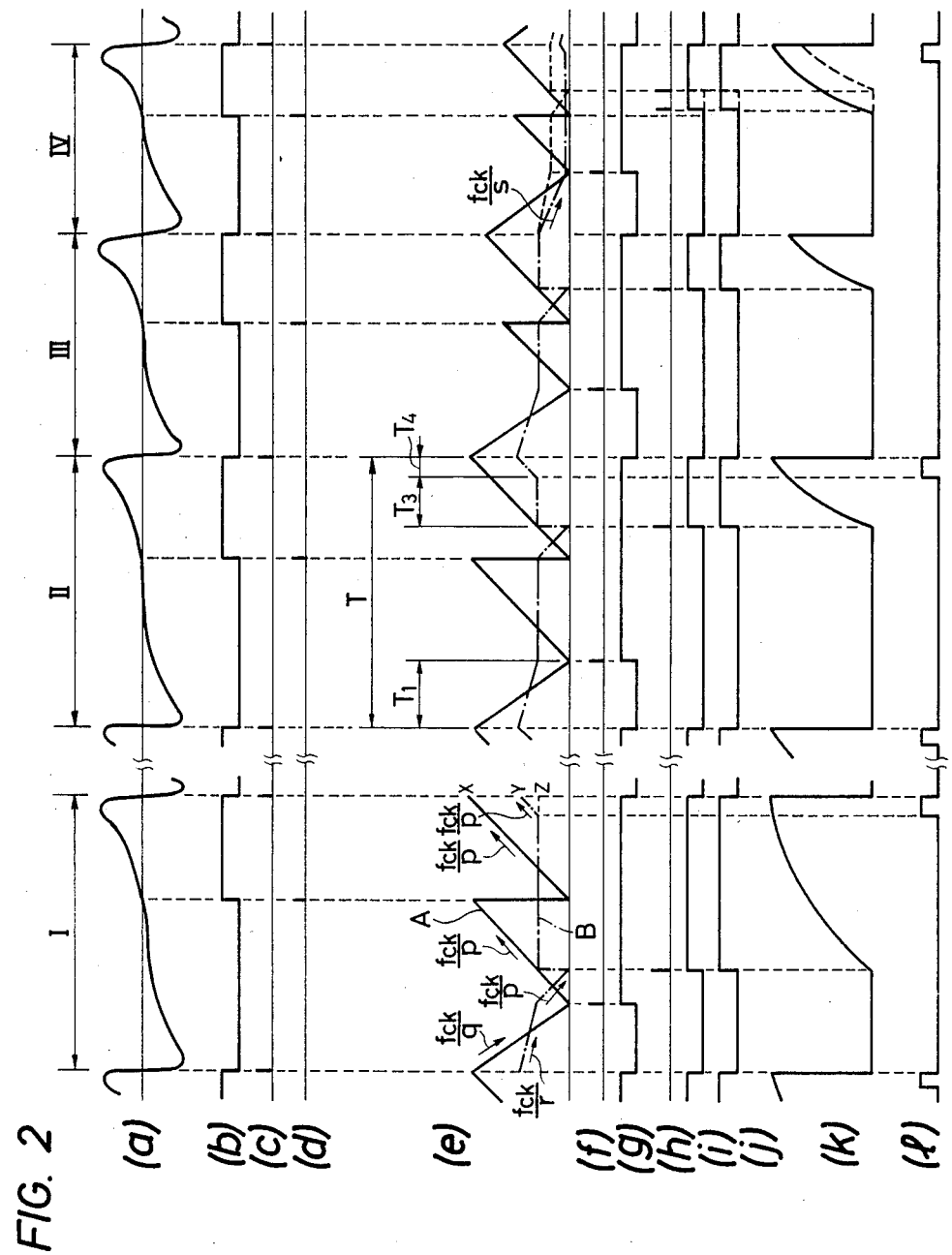

IGNITION CONTROL DEVICE FOR INTERNAL COMBUSTION ENGINE

This is a continuation of application Ser. No. 007,225 filed Jan. 27, 1987, now abandoned.

BACKGROUND OF THE INVENTION

This invention relates to an ignition control device for an internal combustion engine, and particularly to an improved control device for obtaining a required ignition coil cut-off current even during a high rate acceleration of the engine.

An induction discharge type ignition device for use in an internal combustion engine is well known, in which high voltage energy is produced in the secondary side of an ignition coil by cutting off the electric current flowing through the primary winding of the coil so that a spark discharge is produced in an ignition plug connected to the secondary winding of the coil.

In general, the high voltage energy mentioned above depends upon the value of the current flowing through the primary winding of the ignition coil at a time when it is cut off. The current value will be referred to hereinafter as cut-off current.

In order to obtain enough energy to ignite the internal combustion engine, it is necessary to supply an electric current to the primary winding of the ignition coil until the cut-off current becomes adequate to ignite. The time from the start of current supply to the primary winding to the time at which the cut-off current reaches a value large enough to ignite, i.e., the current supply time, is determined by the battery voltage, the inductance on the primary side of the ignition coil and the resistance on the primary side of the coil, etc. Further, the ratio of the current supply time to the ignition period, referred to as a circuit closing ratio hereinafter, depends upon the number of revolutions of the engine. Therefore, the current supply time should be controlled such that a desired cut-off current value is obtained by taking these variables into consideration.

U.S. Pat. No. 4,041,912 and Japanese Kokai No. 17352/1983 disclose control devices capable of controlling the current supply time. Among others, the device disclosed in the latter controls the current supply time such that the ratio of the time period for which the current in the primary winding of the ignition coil is maintained at a predetermined value to the engine ignition period becomes constant.

However, since in such a conventional device, the calculation of the current supply timing is performed uniformly for every ignition period, a current supply time lone enough to ignite can not be obtained during a transient period such as a high acceleration of the engine or a large lead angle of the ignition timing in which the ignition period becomes shorter with the number of ignitions, resulting in a misfiring of the engine.

SUMMARY OF THE INVENTION

A primary object of the present invention is to provide an ignition control device for an internal combustion engine, which is capable of improving a transient response of control of the current supply time by a feedback of the coil current during a high acceleration of the engine to prevent a misfiring of the engine from occurring.

In order to achieve the above object, the ignition control device for the internal combustion engine according to the present invention comprises first means for providing a signal whenever the coil current is at least a predetermined level, second means for feedback-controlling the signal so that a duration of the signal becomes a predetermined value, and third means for modifying feedback control constants of the second means during a high acceleration of the engine in which the first means does not produce the signal.

BRIEF DESCRIPTION OF THE DRAWING

FIG. 2 shows waveforms for explaining the operation of various portions of the control device shown in FIG. 1.

DETAILED DESCRIPTION OF THE PREFERRED EMBODIMENTS

Figure 1:
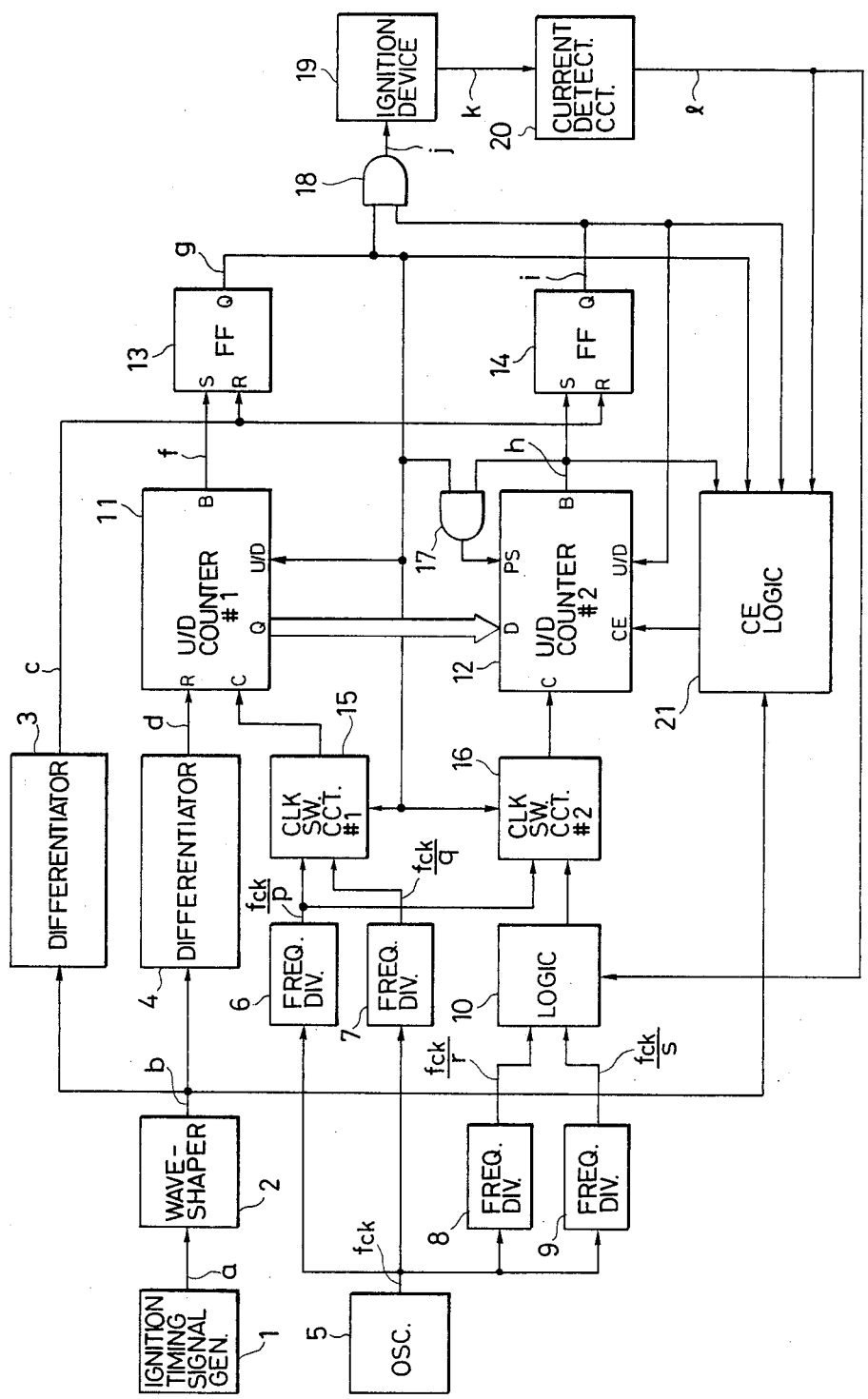
FIG. 1 is a block circuit diagram showing an ignition control device for an internal combustion engine of an embodiment of the present invention.

An embodiment of the present invention will be described with reference to FIG. 1, in which a reference numeral 1 depicts an ignition timing signal generator for generating a signal synchronous with an ignition timing of an engine, and which may be a signal generator housed in a distributor which is not shown. A waveshaper 2 is connected to the ignition timing signal generator 1, which functions to shape an output signal of the ignition timing signal generator 1 to a rectangular wave. Differentiators 3 and 4 have input terminals connected to an output terminal of the waveshaper 2. The differentiator 3 functions to provide a pulse signal at a trailing edge of the rectangular output wave of the waveshaper 2, which corresponds to the ignition timing, and the differentiator 4 provides a pulse signal at a leading edge of the output signal of the waveshaper 2. An oscillator 5 produces clock pulses at a frequency $f_{CK}$ which is divided by frequency dividers 6 to 9 by $1/p$, $1/q$, $1/r$ and $1/s$, respectively.

Output terminals of the frequency dividers 8 and 9 are connected to a first and second input terminals of a 3-input logic circuit 10 whose third input terminal is connected to an output terminal of a current detection circuit 20.

An output terminal of the differentiator 3 is connected to reset terminals R of flip-flops (FFs) 13 and 14. An output terminal of the differentiator 4 is connected to a reset terminal R of a first up/down counter 11 whose clock terminal C is connected to a first clock switching circuit 15. The first up/down counter 11 has an up/down switching input terminal (U/D terminal) connected to an output terminal Q of the FF 13, an output terminal Q connected to a data input D of a second up/down counter 12, and an output terminal B connected to a set terminal S of the FF 13 for providing a borrow signal indicative of a zero content in a down counting mode of operation thereof.

An output terminal of the frequency divider 6 is connected to a first input terminal of the first clock switching circuit 15 and a first input terminal of a second clock switching circuit 16. An output of the frequency divider 7 is connected to a second input of the first clock switching circuit 15. The latter further has a third input which is connected to an output terminal Q of the FF 13.

Clock pulses from the frequency dividers 6 and 7 are switched by the clock switching circuit 15 in response to an output signal of the FF 13 so that either of them is supplied to the clock input C of the first up/down counter 11. That is, when the output of the FF 13 is "H", it provides the output signal frequency $f_{CK}/p$ of the frequency divider 6, and provides the $f_{CK}/q$ of the divider 7 when the output of the FF 13 is "L", as the clock signal.

A second clock switching circuit 16 has three input terminals, the second and third inputs thereof being connected to the output of the logic circuit 10 and the output of the FF 13, respectively. An output terminal of the second clock switching circuit 16 responds to the output of the FF 13 to select one of the output frequencies of the divider 6 and the logic circuit 10 and supply it to the clock terminal C of the second up/down counter 12, such that, when the output of the FF 13 is "H", it selects the output pulse frequency $f_{CK}/p$ of the divider 6 and the output clock pulse of the logic circuit 10 when it is "L".

The second up/down counter 12 further includes a count enable (CE) terminal for enabling a counting operation, an up/down switching terminal U/D, a data input D, a preset terminal PS for setting an input value of the data input terminal D, and a terminal B for providing a borrow signal.

The data input terminal D is connected to the output terminal Q of the first up/down counter 11 and the terminal B is connected to a second input of an AND gate 17, a set terminal S of FF 14 and a first input of a count enable (CE) logic circuit 21.

The AND gates 17 and 18 are 2-input gates having first inputs connected to the output of the FF 13, respectively.

A second input of the AND gate 18 is connected to the Q terminal of the FF 14 which is connected to the U/D terminal of the second up/down counter 12 and the third input of the CE logic circuit 21. The AND gate 18 has an output connected to an ignition device.

The ignition device 19 includes a switching circuit functioning to supply a current to the primary side of the ignition coil when the output signal of the AND gate 18 becomes "H" and, thereafter, to cut off the current when the ignition signal from the AND gate 18 is turned to "L".

A current detection circuit 20 provides a signal so long as the current flowing in the primary side of the ignition coil is at or above a predetermined value, which is supplied to the logic circuit 10 and the CE logic circuit 21. The CE logic circuit 21 has a plurality of inputs connected to the output terminal of the waveshaper 2, the B terminal of the second counter 12, the Q terminal of the FF 13, the Q terminal of the FF 14 and an output of the current detection circuit 20, respectively, and an output connected to the CE terminal of the second counter 12. The CE logic circuit 21 comprises a set of logic circuits capable of performing a logic operation to be described later.

Describing the operation of the device mentioned hereinbefore with reference to FIG. 2, in which a waveform a is an output signal of the ignition timing generator 1, a waveform b is a rectangular signal obtained by shaping the waveform a by using the waveshaper 2 and having a trailing edge corresponding to the ignition timing, waveforms c and d are output signals of the differential circuits 3 and 4, respectively, a waveform e shows contents of the first and second counters 11 and 12 in which a solid portion A shows that of the first counter 11 and a chained portion B shows that of the second counter 12, a waveform f is an output signal (borrow signal) at the B terminal of the first counter 11, a waveform g is an output signal at the Q terminal of the FF 13, a waveform h is a borrow signal of the second counter 12, a waveform i is an output signal at the Q terminal of the FF 14, a waveform j is an output signal (ignition signal) of the AND gate 18, a waveform k is a primary current of the ignition coil and a waveform l is an output signal of the current detection circuit 20, the FF 13 is reset at an ignition time corresponding to the trailing edge of the rectangular pulse on the waveform b by the output pulse c of the differentiator circuit 3 and thus the Q terminal thereof becomes "L" as shown by the waveform g. Therefore, the first counter 11 operates in the down count mode and the first clock switching circuit 15 provides at the output thereof the clock pulse $f_{CK}/q$ from the frequency divider 7. As a result, the first counter 11 down-counts at $f_{CK}/q$ from the ignition time as shown by the waveform e. When the content of the first counter 11 becomes zero, a borrow signal appears at the B terminal thereof as shown by the waveform f, causing the output at the Q terminal of the FF 13 to be inverted from "L" to "H" as shown by the waveform g. Consequently, the first counter 11 changes over to the up-count mode and the first clock switching circuit 15 provides at its output the output of the frequency divider 6, $f_{CK}/p$.

As a result, the first counter 11 produces a first signal which is an up-count at $f_{CK}/p$ as shown by the waveform e.

Then, when the pulse shown by the waveform d is provided by the differentiator 4 at the leading edge of the rectangular wave b, the first counter 11 is reset thereby, and then up-counts the clock pulse $f_{CK}/p$ until a next ignition time to provide a second signal at the Q terminal. Therefore, the content of the first counter 11 repeats up and down in synchronism with the rectangular wave b as shown by the solid line A of the waveform e.

Tables 1 and 2 below show logic operations of the CE logic circuit 21 and the logic circuit 10, respectively. In Table 1, output signal modes of the CE logic circuit with respect to various modes of inputs thereto are classified into modes A to F according to the truth table. "H" in a count enable output mode represents that a count is possible and "L" represents that a count is impossible.

TABLE 1

| | input | | | | | |
|---|---|---|---|---|---|---|
| Mode | Waveshaper output signal | FF 14 output signal | FF 13 output signal | current detection signal | Δ | count enable output |
| A | * | * | L | * | * | H |
| B | * | * | * | H | * | H |
| C | * | H | H | L | * | L |
| D | L | * | H | L | YES | L |
| E | * | L | * | * | NO | H |
| F | H | L | * | * | YES | H |

*: disregarded
Δ: Has the borrow signal of the second counter 12 in a preceding ignition period fallen within a "H" period of the output signal of the waveshaper 2?

TABLE 2

| Mode | input condition whether current detection signal signal provided in a preceding ignition period | output signal of logic circuit 10 |
|---|---|---|
| G | YES | output signal of frequency divider 8 $f_{CK}/r$ |
| H | NO | output signal of fre- |

TABLE 2-continued

| Mode | input condition whether current detection signal signal provided in a preceding ignition period | output signal of logic circuit 10 |
|---|---|---|
| | | quency divider 9 $f_{CK}$/s |

Table 2 shows the output signal modes with respect to a presence and absence of the output signal of the current detection circuit 20 as modes G and H, respectively.

At the ignition time corresponding to the trailing edge of the rectangular wave b, the FF 14 is reset by the output pulse c of the differentiator 3 and thus the Q terminal thereof becomes "L" as shown by the waveform i. Therefore, the second counter 12 is shifted to the down count mode.

On the other hand, the second clock switching circuit 16 provides the output signal of the logic circuit 10 in an "L" output period of the FF 13, i.e., an L region of the waveform g. When there was a current detection signal in the preceding ignition period, the operation becomes G mode, providing the clock pulse $f_{CK}$/r of the divider 8.

In this case, since the input signal condition corresponds to the A mode in the Table 1, the CE logic circuit 21 provides a "H" signal. Therefore, the second counter 12 is down counted at the clock pulse $f_{CK}$/r in the "L" region shown by the waveform g. Then, when the output of the FF 13 is inverted from "L" to "H", the output of the second clock switching circuit 16 is switched to clock pulse $f_{CK}$/p which is the output of the frequency divider 6.

When the time at which the borrow signal is provided by the second counter 12 in the preceding ignition period is fallen in the "L" region of the rectangular wave b, the CE logic circuit 21 provides a "H" signal since the input signal condition corresponds to the E mode in the Table 1. Therefore, the second counter 12 down counts with the clock pulse $f_{CK}$/p as shown by the chain line portion B of the waveform e in a period I in FIG. 2. When the second counter 12 counts down to zero, it provides, at its B terminal, a borrow signal shown by the waveform h. The borrow signal is supplied through the AND gate to the PS terminal of the counter 12 to preset the content of the first counter 11 in the second counter 12. The output of the FF 14 is switched by this borrow signal from "L" to "H" as shown by the waveform i, so that the second counter 12 is switched to the up-count mode. At this time, the output of the AND gate 18 is switched from "L" to "H" as shown by the waveform j and the ignition device 19 supplies a current to the ignition coil. Then, at the ignition time, the output of the AND gate 18 is turned to "L" upon which the primary current of the ignition coil is cut-off to ignite the engine.

The current detection circuit 20 provides a current detection signal shown by the waveform 1 in FIG. 2 continuously so long as the primary current of the ignition coil is at or above the predetermined level, and the current detection signal is supplied to the CE logic circuit 21. In the period in which the output of the FF 14 is "H", i.e., the "H" region of the waveform i in FIG. 2, the CE logic circuit 21 provides a "L" signal in a region where there is no current detection signal, since the input condition corresponds to the C mode in the Table 1. On the other hand, it provides a "H" signal in a region where there is the current detection signal since the input signal condition corresponds to the B mode in Table 1. Therefore, in the "H" output region of the FF 14, i.e., the current supply region of the ignition coil, the second counter 12 does not count, when there is no current detection signal as shown by the waveform e to hold the preset count content mentioned previously and up-counts with the clock pulse $f_{CK}$/p when there is the current detection signal. Thus, the count content of the second counter 12 moves up and down as shown by the chain line in the waveform e in period I in FIG. 2.

An operation of the ignition control device of this invention, in a case where the output timing of the borrow signal of the second counter 12 falls within the "H" period of the rectangular wave b will be described with reference to waveforms shown in a period II in FIG. 2. The second counter 12 counts down with the clock pulse $f_{CK}$/r when the FF 13 is in "L" level in the same manner as mentioned previously. When the output of the FF 13 is turned to "H", the CE logic circuit 21 provides an "L" signal since the input signal condition corresponds to the D mode in Table 1. Therefore, the second counter 12 does not perform the counting operation as shown by the chain line e in period II and, thus, holds the count content at the switching time of the output of the FF 13 from "L" to "H".

When the output signal B of the waveshaper 2 becomes "H", the CE logic circuit 21 provides a "H" signal since the input signal condition corresponds to the F mode. Therefore, the second counter 12 counts down with the clock pulse $f_{CK}$/p. The operation of the control device after the count content of the second counter 12 becomes zero is the same as that mentioned previously.

In this embodiment, the control of the start time of current supply to the ignition coil is performed separately for the case where the circuit closing ratio is large and the current supply start time corresponding to the provision of the borrow signal of the second counter 12 falls in the "L" region of the output signal B of the waveshaper 2, as in period I, and for the case where the circuit closing ratio is small and the current supply start time falls in the "H" region of the output signal of the waveshaper 2 as in period II.

A control of the current supply time for the ignition coil will be described.

As shown in period I in FIG. 2, when the ignition period T, the battery voltage and the ignition coil, etc. are fixed, a time $T_3$ within which the primary current of the ignition coil reaches the predetermined level is constant and the count content X of the first counter 11 and the contents Y and Z of the second counter 12 are constant, respectively. Assuming that a ratio of a "H" period of the rectangular output wave b of the waveshaper 2 to the ignition period is $\alpha\%$, a ratio of the "L" period of the output of the FF 13 to the ignition period, $\beta\%$, can be represented by $$\beta = (q/p) \cdot \alpha$$

and the following equations are established.

$Y = Z + (f_{CK}/r) \cdot T_1$ ($T_1$: "L" period of the FF 13 output)

$Y = Z + (f_{CK}/p) \cdot T_4$ ($T_4$: current detection signal period)

$T_1 = (\beta/100) \cdot T$

From the latter three equations, $T_4 = (q/r) \cdot (\alpha/100) \cdot T$ is obtained.

Therefore, it is clear that the ratio of the time $T_4$ during which the current detection signal is in the "H" level to the ignition period T is $(q/r) \cdot \alpha\%$, constant. This is also true for period II in FIG. 2. Thus, it is possible to control the period in which the primary current of the ignition coil is at or above the predetermined level to a predetermined ratio to the ignition period, because of the feedback control upon the current detection signal.

As to the control of the current supply time in a case where the ignition period T, the battery voltage and the ignition coil, etc. are changed, it can be done in the same manner as that disclosed in the previously mentioned Japanese Kokai No. 17352/1983 and therefore, details thereof are omitted for avoidance of duplication.

When the engine is accelerated at a high rate, the ignition period becomes shortened abruptly as shown in periods III and IV in FIG. 2. In period III in FIG. 2, the cut off current can not reach the predetermined level and, thus, there may be no current detection signal as shown by waveform 1 in period III. In such high acceleration, when the second counter 12 operates in the same manner as that in a normal or low acceleration operation of the engine, the operation in a subsequent ignition period becomes as shown by the dotted line in period IV of the waveform e in FIG. 2.

Since the time for which the ignition coil current flows is short as shown by a dotted line in IV of the waveform k in FIG. 2, it is cut off without reaching the predetermined current value.

In the present invention, however, since the input condition of the logic circuit 10 becomes H mode as shown in Table 2 when there is no current detection signal provided, the clock pulse is switched from $f_{CK}/r$ of the frequency divider 8 to $f_{CK}/s$ of the frequency divider 9, where a relation between r and s is set as $s < r$.

In the L region shown in the portion IV of the waveform g in FIG. 2, the second up.down counter 12 downcounts the clock pulse $f_{CK}/s$ from the divider 9 as shown by a chain line portion of the waveform e, the count content being smaller compared with the case of counting of the clock pulse $f_{CK}/r$ from the divider 8.

Therefore, the current flowing through the ignition coil can reach the predetermined value due to the fact that the current supply time is enough as shown by a solid line portion of the waveform k in the portion IV thereof in FIG. 2.

When there is no current detection signal provided, the constant r of the feedback control of the second up/down counter 12 at a subsequent ignition period is changed to s by the logic circuit 10, so that the current supply time at high rate acceleration is compensated for to prevent the reduction of the cut off current.

In the described embodiment, the current supply timing control is performed by using the ignition period divided into two portions. This scheme can be applied to the conventional control device, as well.

Although, in the embodiments described hereinbefore, digital circuits such as up.down counters, are used, it is possible to constitute them with analog circuits by, for example, substituting integration circuits for the up/down counters and substituting integration time constant switching circuit for the clock switching circuit, etc.

What is claimed is:

1. An ignition control device for an internal combustion engine, comprising: means for preventing engine misfirings during periods of high acceleration due to the current flowing through an ignition coil primary winding failing to reach a predetermined magnitude, said preventing means including first magnitude detector means (20) for producing an output signal whenever the magnitude of a current flowing through said ignition coil primary winding is at or higher than a predetermined level, second means (21, 12), including a counter, responsive to said output signal from said first means for feedback controlling a period of said current flow to a predetermined length, and third means (10) for changing a constant (r,s) of said feedback control of said second means by increasing the frequency of a clock signal applied to said counter when said first means produces no output signal, as during high accelerations of the engine.

2. The ignition control device as claimed in claim 1, wherein said second means includes fourth means for producing a signal for a predetermined ratio of time to the ignition period to control said predetermined period (T) of said signal from said first means such that it has a predetermined ratio to said signal of said fourth means.

3. The ignition control device as claimed in claim 1, wherein said third means is operable to change the feedback control constant in a subsequent ignition period in a direction such that the current supply period of current to said ignition coil increases, when said first means provides no signal.

* * * * *